INVENTORS
HENRY A. BOURNE
PRESTON L. GANT
JACK J. REYNOLDS
BY Jerry J. Dunlap
ATTORNEY July 19, 1960    H. A. BOURNE ET AL    2,945,952
METHOD AND APPARATUS FOR LOCATING PRODUCING ZONES IN WELLS
Filed April 23, 1956    3 Sheets-Sheet 2
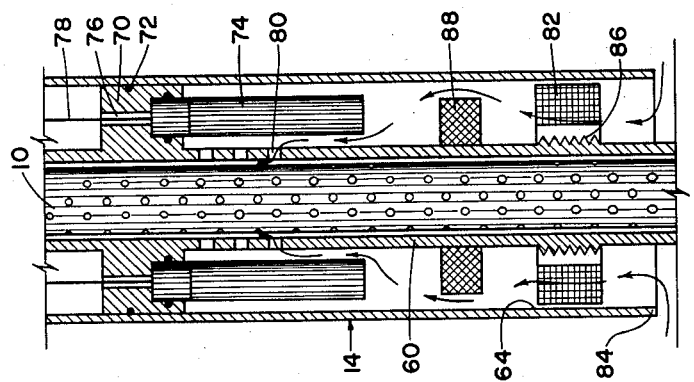
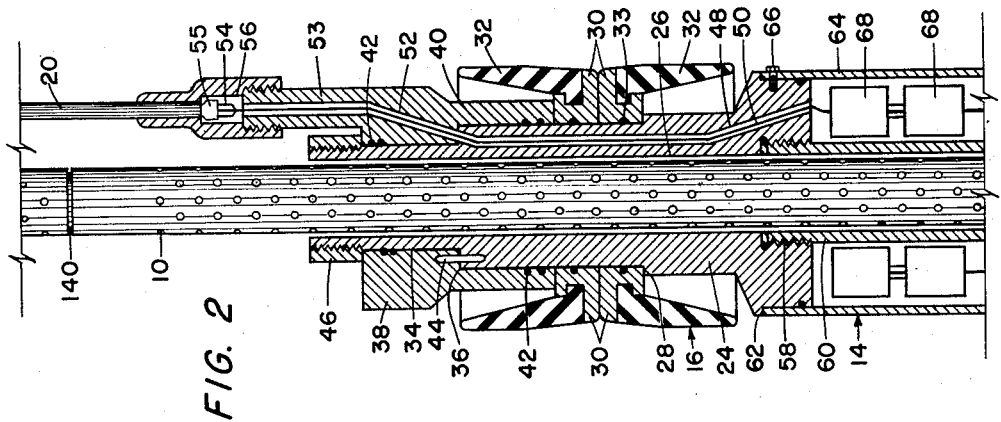
INVENTORS
HENRY A. BOURNE
PRESTON L. GANT
JACK J. REYNOLDS
BY *Jerry J. Dunlap*
ATTORNEY

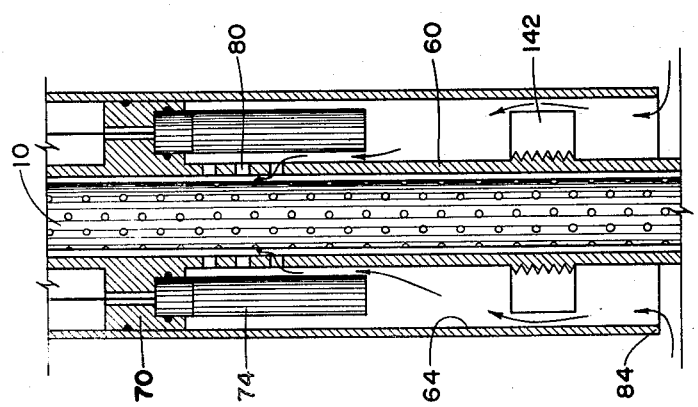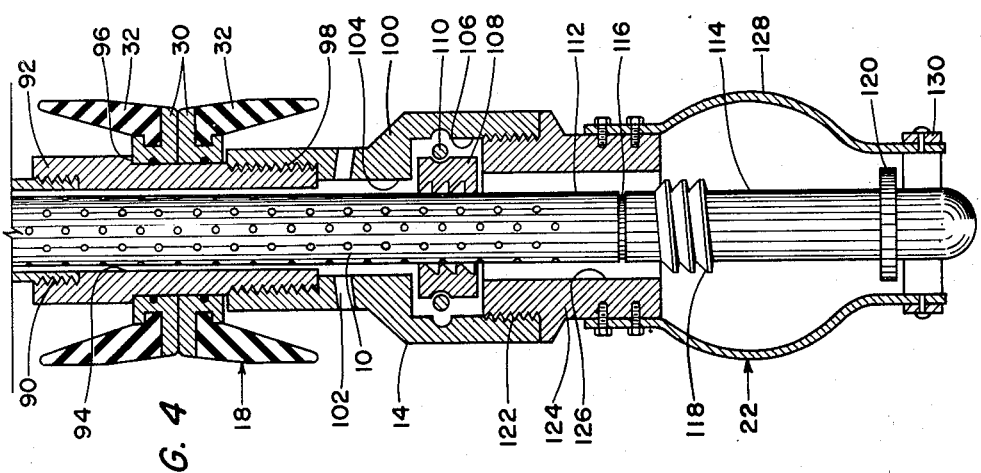

2,945,952

METHOD AND APPARATUS FOR LOCATING PRODUCING ZONES IN WELLS

Henry A. Bourne, Preston L. Gant, and Jack J. Reynolds, Ponca City, Okla., assignors to Continental Oil Company, Ponca City, Okla., a corporation of Delaware Filed Apr. 23, 1956, Ser. No. 579,790

7 Claims. (Cl. 250—43.5)

This invention relates to improvements in methods of and apparatus for determining the location of oil and water producing zones in wells.

A large portion of the present day oil wells produce both oil and water. The water is ordinarily considered a useless product, and its presence in the produced fluid increases the cost of recovering the oil from the well. When the zone or zones of water influx are separate from the oil producing zones, it is highly desirable to locate and plug off the water producing zones to increase the oil-water ratio and provide a more efficient operation.

Perhaps the best known and commonly used method of testing the various zones in a well is by use of the drill string during or immediately following the drilling of the well. In this test, the zone being tested is isolated with packers on the drill stem. The zone between the packers is then vented through the drill string to the surface of the well to determine if oil, water, or gas will be produced from the zone being tested. As noted, this method is used only during or immediately following the drilling operation; requires the use of the drill string, as well as special fittings on the drill string, and the back-pressure on the formation being tested is different from what it will be during production of the well. Frequently, a zone will produce oil immediately after the drilling operation, but after the well has been on production for a relatively short period of time, the particular zone or formation will start producing water. It is then desirable to close off this zone. It will be apparent that the drill stem type of test for locating such a zone is highly impractical.

Another commonly known method of studying the producing zones of a well is by the use of a spinner survey. In this method, an impeller-actuated instrument is moved progressively through the well and the fluid flowing through the instrument turns the impeller. However, the impeller turns when either oil or water is directed through the instrument and, as a practical matter, the instrument is used only to indicate the zones of production, without making a distinction between oil and water.

It is also known to use radiological means in a well for determining the presence of oil or water. However, to the best of applicants' knowledge no method or apparatus for isolating the various zones while using a radiological means has been devised, at least where the normal operating conditions in the well remain unchanged during the testing. In each known prior apparatus, either the intermixing of fluids produced from various zones is not prevented (to seriously limit the accuracy of the test), or the various zones are isolated in such a manner that the normal pressure balance in the well is upset to vary the normal flow rate of fluid being produced from the particular zone under test.

The present invention contemplates a novel method of and apparatus for testing the various zones in a well under normal operating conditions, whereby the location of water producing zones may be accurately determined. In our method the various zones are successively isolated against vertical flow of fluid adjacent the formation face or well casing, yet the back-pressure on the zone under test is essentially undisturbed. As the fluid is produced from the zone under test, it is directed through a radiological measuring apparatus and only then is permitted to intermingle with the fluid being produced from adjacent zones. As to apparatus, we contemplate a housing having vertical and horizontal passages therethrough, with the measuring apparatus supported in the housing in position to analyze the fluid flowing through the horizontal passages. Packers are spaced above and below the horizontal passages to inhibit vertical migration of fluid around the housing and direct the fluid produced from the zone under study through the horizontal passages. When a water-producing zone has been located it may be closed off by any suitable technique, such as a squeeze cementing, as is well known in the art.

An important object of this invention is to accurately locate water and oil producing zones in a completed oil well.

Another object of this invention is to analyze the fluid being produced from a predetermined zone in a well without materially affecting the normal pressure balance in the well.

A further object of this invention is to analyze fluids produced from various zones in a well while the well is on production.

Another object of this invention is to obtain information for increasing the efficiency of oil well pumping installations.

A still further object of this invention is to provide an apparatus for locating oil and water producing zones in a well which is simple in construction and may be economically manufactured.

Other objects and advantages of the invention will be evident from the following detailed description, when read in conjunction with the accompanying drawings which illustrate our invention.

In the drawings:

Figure 2 is a vertical sectional view through the upper portion of our novel apparatus.

Figure 3 is a continuation of Figure 2 illustrating the central portion of the apparatus and one form of measuring apparatus which can be used.

Figure 4 is a vertical sectional view of the lower portion of the apparatus and is a continuation of Figure 3.

Figure 5 is another vertical sectional view of the same portion shown in Figure 3, but illustrating another type of measuring apparatus.

Figure 1:
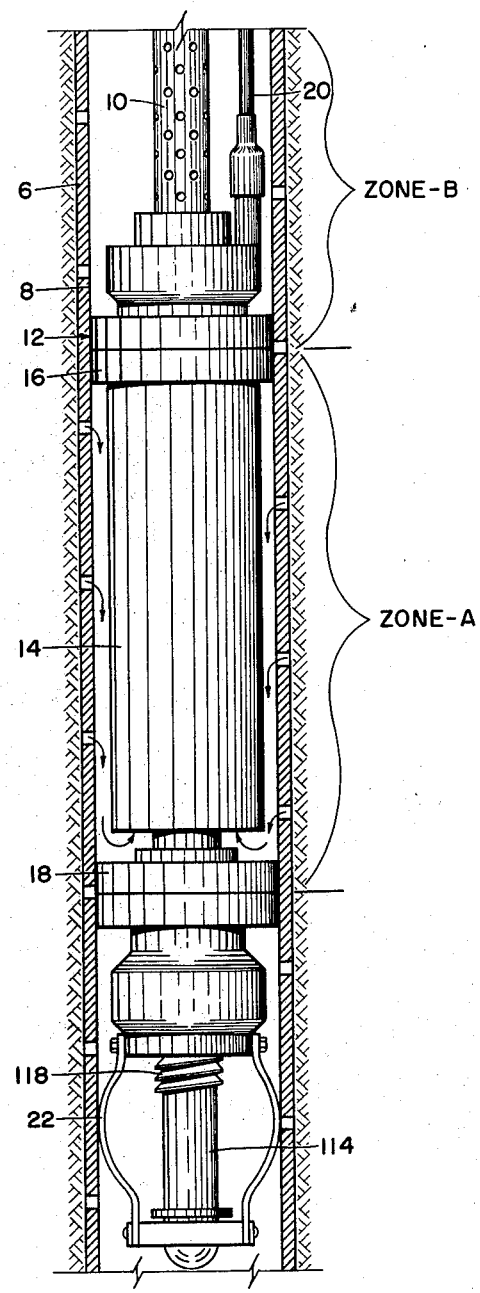
Figure 1 is a vertical sectional view through a portion of an oil well illustrating the use of our novel apparatus, with the apparatus being shown in elevation.

Broadly stated, the present invention may be defined as an apparatus for studying the composition of fluids produced from various zones in a well, comprising an elongated housing having a longitudinal bore therethrough and a flow channel extending transversely therethrough in communication with the longitudinal bore, packers around the housing above and below the flow channel for loosely contacting the walls of the well and inhibiting vertical migration of fluids around the housing, measuring apparatus carried by the housing for determining the composition of fluids flowing throught said flow channel, and means for moving the housing through the various zones in the well, whereby the fluid produced in each zone of the well is selectively directed through said flow channel and studied without materially affecting the back-pressure on the zone being investigated.

Referring to the drawings in detail, and particularly Figure 1, reference character 6 designates a well bore which extends vertically through a plurality of formations. The zones of the well bore 6 opposite two of the formations have been marked A and B to facilitate explanation of the invention, as will hereinafter appear. A casing 8 is set in the well bore 6 and is usually cemented (not shown) to the walls of the bore 6 through at least the lower portion of the well. Also, the casing 8 is perforated throughout the potential producing formations, whereby the formation fluids can migrate into the well and be removed by any suitable pumping system (not shown). A tubing string 10 is suspended from the surface of the well to hang in the central portion of the casing 8, and the tubing is perforated throughout the producing zones of the well for purposes which will be hereinafter set forth. Our novel apparatus, generally indicated at 12, is telescoped over the perforated tubing 10.

In general, the apparatus 12 comprises a tubular housing 14 of a size to telescope over the perforated tubing 10 within the well casing 8. A pair of packer assemblies 16 and 18 are secured in spaced relation around the housing 14 to control the vertical flow of fluid around the housing. Each of the packer assemblies 16 and 18 is of a size to loosely engage the inner periphery of the well casing 8, whereby flow of fluid past the packers will be inhibited, yet the apparatus 12 may be moved vertically through the casing. The apparatus 12 is moved upwardly through the casing 8 by means of a cable 20, as will be described in detail below. Also, a centralizer 22 is secured on the lower end of the housing 14 to engage the inner periphery of the casing 8, align the housing 14, and prevent rotation of the housing 14.

Referring to the more detailed disclosure in Figures 2, 3 and 4, and particularly Figure 2, it will be observed that the housing 14 includes an upper sub 24 having a longitudinal bore 26 extending therethrough, with the bore 26 being of a size to loosely receive the perforated tubing 10. An upwardly facing circumferential shoulder 28 is formed on the outer periphery of the sub 24, at the medial portion of the sub, to prevent downward movement of a pair of packer retaining rings 30 of the upper packer assembly 16. The rings 30 are of a size to slide down over the upper portion of the sub 24 into contact with the shoulder 28, and each ring 30 supports a resilient packer element 32. The packer elements or rings 32 extend in opposite directions from the rings 30, and are of a size to rather loosely engage the well casing 8 (see also Figure 1). Therefore, the rings 32 will inhibit vertical flow of fluids past the packer assembly 16, yet the rings 32 will not seriously prevent vertical movement of the apparatus 12 through the casing 8. It will also be observed that the rings 30 are suitably sealed to the sub 24 by sealing rings 33.

The upper end portion 34 of the sub 24 is reduced in diameter to provide another upwardly facing shoulder 36. A head 38 is telescoped down over the upper end portion 34 of the sub 24 into contact with the shoulder 36. The head 38 has a downwardly extending circumferential flange 40 of a size to surround the central portion of the sub 24 and contact the upper packer retaining ring 30, whereby the retaining rings 30 are held in contact with the shoulder 28 and on assembly on the sub 24. Suitable sealing rings 42 are secured in the inner periphery of the head 38 and the flange 40 to prevent leakage of fluid around the sub 24. Also, at least one dowel pin 44 is disposed in complementary bores of the shoulder 36 and the head 38 to align the head 38 as will be more fully hereinafter set forth. The extreme upper end of the sub 24 is externally threaded to receive a nut 46 which engages the upper end of the head 38 and retains the head 38 in its lowermost position on the sub 24.

A vertical bore 48 is formed through one side of the sub 24 to receive a plurality of electrical lead lines 50. A similar sized bore 52 is formed through one side of the head 38 and is aligned with the bore 48 when the dowel pin 44 is inserted between the head 38 and the sub 24. The bore 52 extends upwardly through an arm 53 of the head 38 to receive and protect the upper end portion of the leads 50. A connector 54 is secured on the upper ends of the leads 50 immediately above the arm 53 to engage a complementary socket 55 depending from the lower end of the cable 20. The cable 20 is preferably a strong cable of the type now used on well logging instruments and performs the function of raising the apparatus 12, as well as transmitting signals to and from the surface. A cable connector 56 on the lower end of the cable 20 surrounds the electrical connector 54 and engages external threads on the upper end of the arm 53 to firmly secure the cable 20 to the apparatus 12.

A counter-bore 58 is formed in the lower face of the sub 24 around the longitudinal bore 26 and is threaded to receive the upper threaded end of a center tube 60, which extends down around the tubing 10. Also, the outer diameter of the sub 24 is increased at the lower end of the sub and is provided with a downwardly facing circumferential shoulder 62. A tubular sleeve or guard 64 (having a substantially larger diameter than the tube 60) extends up around the lower portion of the sub 24 into contact with the shoulder 62. The sleeve 64 is suitably secured to the sub 24 by one or more stud bolts 66 to prevent downward movement of the sleeve 64 off of the sub 24. As will be more fully hereinafter explained, the sleeve 64 has no downward forces imposed thereon, therefore the stud bolts 66 may be limited in number.

The leads 50 extending through the bore 48 of the sub 24 extend on down below the sub into connection with suitable power and amplifying equipment 68. The equipment 68 may be secured around the center tube 60 and within the sleeve 64 in any suitable manner.

low the sub 24 a substantial distance and has a circum-

As shown in Figure 3, the center tube 60 extends below the sub 24 a substantial distance and has a circumferential flange 70 formed around the central portion thereof. The flange 70 extends outwardly into contact with the inner periphery of the sleeve 64 and is sealed to the sleeve 64 by use of suitable sealing rings 72. A plurality of radiological detectors 74 of any suitable type, such as scintillators or geiger counters, are secured in the lower end portion of the flange 70. Also, a small vertical bore 76 is formed through the flange 70 above each detector 74 to accommodate lead lines 78 which extend upwardly from the detectors 74 to the power and amplifying equipment 68 for transmitting signals from the detectors 74.

A plurality of transverse apertures 80 are formed in the center tube 60 immediately below the flange 70 to direct formation fluids inwardly into the tubing 10 after the passage of the fluids past the detectors 74, as will be more fully hereinafter set forth. A wire mesh container 82 is secured around the center tube 60 near, but above, the lower end 84 of the sleeve 64. The container 82 may be secured on the tube 60 in any desired manner, such as by the use of a ring 86 on the inner periphery of the container 82 which is threaded on the tube 60. The container 82 is provided to support a quantity of radioactive salt which is a gamma ray or a strong beta ray emitter. This radioactive salt may be either oil-soluble or water-soluble as will be more fully hereinafter set forth. A lead shield 88 is secured on the center tube 60 between the detectors 74 and the container 82 to prevent a direct transmission of radiation from the radioactive salt in the container 82 to the detectors 74. The shield 88 is of a size to permit substantially free passage of fluids between the shield and the sleeve 64. It will also be observed that the lower end 84 of the sleeve 64 is open and terminates a short distance above the lower end 90 (see Fig. 4) of the center tube 60.

The lower end 90 of the center tube 60 is externally threaded to receive a lower sub 92. A longitudinal bore 94 is formed through the central portion of the sub 92 and has a diameter sufficiently large to loosely receive the tubing 10. The sub 92 also has a downwardly facing circumferential shoulder 96 on the outer surface thereof to limit the upward movement of another pair of retaining rings 30 of the lower packer assembly 18. Another pair of resilient rings 32 are secured in the retaining rings 30 to complete the structure of the lower packer assembly 18. And, the lower packer assembly 18 functions in the same way as the upper packer assembly 16 to prevent vertical migration of fluids around the housing 14.

External threads 98 are formed on the lower end of the sub 92 to receive the upper end of a head member 100. The head 100 extends upwardly around the sub 92 to engage the lower retaining ring 30 and effectively secure the lower packer assembly 18 in position between the shoulder 96 and the head 100. Also, the head 100 has a longitudinal bore 104 therethrough which is slightly larger than the bore 94 of the sub 92. A plurality of transverse ports 102 are formed through the medial portion of the lower head 100 to provide access for fluids from around the head 100 to the tubing 10. A counter-bore 106 is formed in the lower portion of the head 100 concentrically around the inner bore 104 to loosely receive a segmented, buttress thread latch 108 of the type well known in the art. A garter spring 110 surrounds the latch 108 to retain the latch 108 in its innermost or closed position around the tubing 10 as will be hereinafter set forth.

The lower end 112 of the tubing 10 has a plug portion 114 secured thereon by means of a coupling 116. It will be observed that the coupling 116 is formed in such a manenr that its outer diameter is no larger than the outer diameter of the remainder of the tubing 10. The plug member 114 has a plurality of threads 118 formed on the outer periphery thereof to engage the buttress thread latch 108 when the apparatus 12 is moved downwardly over the tubing 10. The threads 118 and the threads of the latch 108 are preferably right-hand threads to facilitate disengagement of the tubing 10 from the apparatus 12 as will be more fully hereinafter set forth. The plug 114 also has a circumferential shoulder 120 on the outer surface thereof below the threads 118 to engage the lower end of the apparatus 12 and lift the appratus 12 when it is desired to remove the apparatus from a well.

Internal threads 122 are formed at the lower end of the counter-bore 106 to receive the upper end of the centralizer 22. The centralizer 22 comprises a head portion 124 having an enlarged longitudinal bore 126 for loosely surrounding the tubing 10 and accommodating the threads 118. A plurality of bow springs 128 are secured to the lower end of the centralizer head 124 and extend downwardly into engagement with the usual floating ring 130. The ring 130 is of a size to accommodate both the flange 120 and the threads 118 of the plug member 114. The springs 128 are preferably twisted or turned at an angle with respect to the centralizer head 124, whereby the springs will tend to bite into the well casing 8 when the apparatus 12 is rotated in a clockwise direction. Therefore, the springs 128 will resist clockwise rotation of the apparatus 12 and will permit the clockwise rotation of the tubing 10 in the apparatus 12 for disengaging the threads 118 from the buttress thread latch 108.

*Operation*

Before running the apparatus 12 in the well bore 6, the wire mesh container 82 (Fig. 3) is filled with a radioactive salt. Let us assume that the salt being used is a gamma ray emitter and is water-soluble. The apparatus 12 is then telescoped onto the lower-most joint of the perforated tubing 10, with the buttress thread latch 108 (Fig. 4) in engagement (not shown) with the threads 118 of the plug 114. It will then be apparent that the apparatus 12 will be secured on the tubing 10. The tubing string 10 is then run in the well bore 6 (Fig. 1) and extended down to the lower portion of the well. The apparatus 12 will be moved downwardly with the tubing string, and the cable 20 will be extended or payed out during the downward movement of the apparatus 12. The packer assemblies 16 and 18 will slide along the inner wall of the casing 8 and will provide some resistance to the downward movement of the apparatus 12. However, the packer assemblies only loosely engage the casing 8 and will not restrict movement of the apparatus 12 sufficiently to cause disengagement of the buttress thread latch 108 from the threads 118.

When the apparatus 12 has been lowered to the desired position (for example, opposite the zone A as shown in Fig. 1), the tubing string 10 is rotated clockwise to disengage the threads 118 from the latch 108. As previously noted, the bow springs 128 of the centralizer 22 bite into the inner wall of the casing 8 and prevent rotation of the apparatus 12 during clockwise rotation of the tubing string 10. The upper end of the cable 20 is then connected to a suitable recording apparatus (not shown) for recording the response of the dectectors 74. Also, the cable 20 will be extended over a measuring reel or the like (not shown) at the surface, as in well logging operations, whereby the depth of the apparatus 12 will be known.

As the formation fluid from the zone A migrates into the well casing 8, it is directed downwardly to the lower open end 84 (see Fig. 3) of the sleeve 64 and then upwardly through the sleeve 64 and the apertures 80 into the perforated tubing 10. As the fluid flows through the wire mesh container 82, any water in the fluid will dissolve a portion of the radioactive salt and carry the salt upwardly around the shield 88 and the detectors 74. As the radioactive salt is carried upwardly beyond the shield 88, the detectors 74 will detect the gamma rays emitted by the dissolved salt to indicate the presence of water in the particular fluid. The signals from the detectors 74 are amplified by the equipment 68 and fed to the recording mechanism at the surface through the cable 20. When the concentration and amount of the salt in the container 82 is known, the radiation detected by the detectors 74 will also indicate the amount of water flowing through the sleeve 64.

With the apparatus 12 in the position shown in Fig. 1, the upper packer assembly 16 will inhibit the upward flow of fluid from the zone A and the downward flow of fluid from the upper zone B along the inner wall of the casing 8. Also, the lower packer assembly 18 inhibits the downward flow of fluid from zone A from around the housing 14, as well as the upward flow of fluid which may be present in the casing 8 below the packer assembly 18. Therefore, all of the fluid produced in zone A will be directed through the measuring apparatus( comprising the detectors 74, container 82 and shield 88), and all other fluid produced in the well will be restricted from the measuring apparatus.

During use of the apparatus 12 as previously described, it is assumed that the well is producing in the normal manner, either by flowing in response to the natural pressure of the formations surrounding the well bore 6, or by artificial lifting means (not shown) installed in the tubing string 10 above the perforated sections. Therefore, the fluids being produced below the apparatus 12 will flow into the perforated tubing 10 through the centralizer 22 and ports 102 (Fig. 4) to co-mingle with the fluid produced in zone A after the fluid from zone A has traversed the measuring apparatus. Also, these fluids will co-mingle with the fluids produced in zone B, and all other upper formations, within and around the perforated tubing 10 above the apparatus 12. It will thus be apparent that the pressure created by all of the producing zones will be exerted through the perforated tubing 10, the apertures 80 in the central portion of the apparatus 12, and the sleeve 64 against the formation surrounding zone A. This pressure condition simulates the normal back-pressure on the formation surrounding zone A to provide a normal flow of fluids into zone A, whereby an indication of the water content of the fluid normally produced through zone A may be obtained.

After the fluid produced in zone A has been adequately tested, the cable 20 is pulled upwardly by any suitable means to move the apparatus 12 upwardly on the perforated tubing 10. It will be observed in Fig. 2 that the couplings 140 which interconnect the sections of the perforated tubing 10 are formed flush with the outer periphery of the tubing 10 to facilitate the movement of the apparatus 12 thereover. The apparatus 12 is moved upwardly to any desired extent, such as to a position opposite zone B (Fig. 1). It will again be noted that the packer assemblies 16 and 18 will slide along the inner periphery of the casing 8 and not seriously retard the upward movement of the apparatus 12.

The apparatus 12 is positioned opposite zone B for a sufficient length of time to test the fluids produced in zone B in the same manner as previously described. The apparatus 12 can then be moved on upwardly to the next upper position and the operation repeated. In some wells, it may be desirable to move the apparatus 12 a distance less than the distance between the packer assemblies 16 and 18 to provide an efficient determination of all of the oil and water producing zones in the well.

If it is desired to repeat the survey made by the apparatus 12, the tubing string 10 may be raised until the threads 118 are engaged (not shown) by the buttress thread latch 108. The tubing string 10 is then again lowered to the position shown in Fig. 1 to reposition the apparatus 12 opposite the zone A in the same manner as when the apparatus 12 was first run into the well.

It will be understood that the radioactive salt used in the wire mesh container 82 may also be a strong beta emitter, and the apparatus 12 will operate substantially in the same manner as previously described. Also, the salt may be oil-soluble and either a gamma ray emitter or strong beta emitter. In this last instance, the apparatus 12 will measure the amount of oil produced in each zone tested, as contrasted with water. In either event, the apparatus 12 may be used in conjunction with a spinner survey as previously described, to give a more perfect indication of the relative amounts of oil and water produced in the various zones.

In Figure 5 we have shown another embodiment of the invention which involves the use of a different type of measuring apparatus. The measuring apparatus shown in Figure 5 uses the detectors 74 secured in the flange 70 as previously described, and a container 142 (having a gamma ray emitter of any suitable type, such as Cesium-137 or Cobalt-60 therein) on the center tube 60 in approximately the same position as the previously described wire mesh basket or container 82. It will also be observed that the lead shield 88 has been eliminated. The remaining structure of the apparatus 12 remains unchanged. Therefore, the fluid from the zone under test will be directed upwardly through the sleeve 64 and then inwardly through the apertures 80 of the center tube 60 into the perforated tubing 10 in the same manner as previously described. However, with the apparatus shown in Figure 5, the gamma ray emitter in the container 142 will project a constant stream of gamma rays toward detectors 74, and the fluid flowing through the sleeve 64 will be subjected to these gamma rays prior to its entry into the perforated tubing 10. Since the density of materials affects the transmission of gamma rays, and oil is less dense than water, the presence of water in the fluid flowing through the sleeve 64 will provide the greater absorption of the gamma rays. Therefore, the amount of gamma rays reaching the detector 74 will be an indication of the relative amounts of oil and water in the fluid flowing through the sleeve 64.

It will therefore be apparent that the measuring apparatus shown in Figure 5 will indicate the presence of oil or water in the fluid produced from the various zones in a well in substantially the same manner as the measuring apparatus shown in Figure 3. Also, the measuring apparatus shown in Figure 5 may be used in conjunction with a spinner survey to give a more complete determination of the location and composition of fluids produced in a well.

From the foregoing it will be apparent that the water and oil producing zones in a completed oil well may be accurately deermined by the use of this invention. The fluid being produced from any predetermined zone in a well may be analyzed without materially affecting the normal pressure balance in the well and without materially changing the back-pressure on the formation being tested. After the water producing zones have been located, they may be closed off by squeeze cementing or the like to provide an effective increase in the oil-water ratio of the fluid produced from the well. The efficiency of oil well pumping installations may be increased by use of the information obtained by this invention, and the required apparatus is simple in construction and may be economically manufactured.

Although we have shown and described the invention in connection with the testing of zones of a well which has been cased and perforated, it will be understood by those skilled in the art that the apparatus may be used in uncased or open hole sections of a well, providing the walls of the well bore are relatively smooth. The flexibility of the packer rings 32 may be designed to contact the walls of a well bore even though the diameter of the bore may vary, providing the variations are within practical limits.

Changes may be made in the combination and arrangement of parts as heretofore set forth in the specification and shown in the drawings, it being understood that changes may be made in the precise embodiment shown without departing from the spirit and scope of the invention as set forth in the following claims.

We claim:

1. An apparatus for studying the composition of fluids produced from various zones in a well through a tubing string suspended in the well and having a plurality of perforations therethrough opposite the zones to be investigated, comprising an elongated housing having a longitudinal bore therethrough and a flow channel extending transversely therethrough in communication with the longitudinal bore, said housing being telescopically received on said tubing string through said longitudinal bore, packers around the housing above and below the flow channel for loosely contacting the walls of the well and inhibiting vertical migration of fluids around the housing, measuring apparatus carried by the housing for determining the composition of fluids flowing through said flow channel, and means independent of the tubing string of said well for telescopically moving the housing through the various zones in the well, whereby the fluid produced in each zone of the well is selectively directed through said flow channel and studied without materially affecting the back-pressure on the zone being investigated.

2. An apparatus as defined in claim 1 characterized further in that the measuring apparatus comprises a perforated basket secured in said flow channel in the path of fluids flowing through said channel, radioactive material in the basket which is soluble in one expected component of the fluid, a radiological detector in the housing in a position to be exposed to the fluid downstream of the basket, and a radiation shield in said housing between the basket and the detector.

3. An apparatus as defined in claim 2 characterized further in that the radioactive material is oil-soluble.

4. An apparatus as defined in claim 2 characterized further in that the radioactive material is water-soluble.

5. An apparatus as defined in claim 1 characterized further in that projections are formed on the lower end of the tubing and latches are carried in the housing around said longitudinal bore for engaging said projections and providing downward movement of the housing upon downward movement of the tubing string.

6. An apparatus as defined in claim 1 characterized further in that the measuuring apparatus includes a radioactive source and a radiological detector for indicating the presence of at least one predetermined component in the fluid flowing through the flow channel.

7. An apparatus as defined in claim 6 characterized further in that the radioactive source is a gamma ray emitter and the detector indicates the absorption of gamma rays by the fluid, whereby the proportion of the water and oil in the fluid flowing through the flow channel may be determined.

References Cited in the file of this patent

UNITED STATES PATENTS

| | | |
|---|---|---|
| 2,433,718 | Teplitz | Dec. 30, 1947 |
| 2,564,198 | Elkins | Aug. 14, 1951 |
| 2,607,222 | Lane | Aug. 19, 1952 |
| 2,659,046 | Arps | Nov. 10, 1953 |
| 2,688,872 | Hartline et al. | Sept. 14, 1954 |
| 2,735,944 | Greer | Feb. 21, 1956 |